US006021677A

United States Patent [19]

Hepner

[11] Patent Number: 6,021,677

[45] Date of Patent: Feb. 8, 2000

[54] PIPELINE SYSTEM FOR THE CONTROLLED DISTRIBUTION OF A FLOWING MEDIUM AND METHOD FOR OPERATING SUCH A PIPELINE SYSTEM

[75] Inventor: Stephan Hepner, Althäusern, Switzerland

[73] Assignee: Asea Brown Boveri AG, Baden, Switzerland

[21] Appl. No.: 09/133,668

[22] Filed: Aug. 12, 1998

[30] Foreign Application Priority Data

Aug. 15, 1997 [EP] European Pat. Off. .............. 97810570

[51] Int. Cl.[7] .............................................. G01F 1/34

[52] U.S. Cl. .............................................. 73/861.42

[58] Field of Search ............................ 73/861.42, 861.47, 73/861.65, 861.61, 861.01; 340/606, 506, 507, 508; 406/14, 19, 93

[56] References Cited

U.S. PATENT DOCUMENTS

| | | | |
|---|---|---|---|
| 3,821,897 | 7/1974 | Frazel | 73/861.47 |
| 4,662,798 | 5/1987 | Fassbinder | 406/14 |
| 4,839,571 | 6/1989 | Farnham et al. | 340/606 |
| 4,900,445 | 2/1990 | Flanigan et al. | 73/861.65 |
| 5,307,668 | 5/1994 | Vander Heyen | 73/861.01 |
| 5,583,302 | 12/1996 | Perrin | 73/861.351 |

FOREIGN PATENT DOCUMENTS

| | | |
|---|---|---|
| 0576819A1 | 1/1994 | European Pat. Off. . |
| 0669287A1 | 8/1995 | European Pat. Off. . |

*Primary Examiner*—William Oen

*Attorney, Agent, or Firm*—Burns, Doane, Swecker & Mathis, L.L.P.

[57] ABSTRACT

A pipeline system (10) for the controlled distribution of a flowing medium comprises a main line (11) which branches at a branching point (12) into a plurality of branch lines (13,14,15), in each of the branch lines a variable restrictor (V1,V2,V3), by means of which the mass flow in each of the branch lines (13,14,15) can be adjusted and, belonging to each restrictor (V1,V2,V3), a first pressure measuring device (PM1,PM2,PM3), by means of which the pressure drop of flowing medium at the respective restrictor (V1,V2, V3) is measured. Redundancy in measurement, at a limited additional outlay, is obtained in that at least between two of the branch lines (13,14, or 13,15 or 14,15) a second pressure measuring device (PM10 or PM11 or PM12) for measuring the differential pressure between the respective branch lines (13,14 or 13,15 or 14,15) is arranged downstream of the restrictors (V1,V2 or V1,V3 or V2,V3) in the direction of flow.

7 Claims, 2 Drawing Sheets

PIPELINE SYSTEM FOR THE CONTROLLED DISTRIBUTION OF A FLOWING MEDIUM AND METHOD FOR OPERATING SUCH A PIPELINE SYSTEM

BACKGROUND OF THE INVENTION

1. Field of the Invention

The present invention relates to a pipeline system for the distribution of a flowing medium, comprising a main line which branches at a branching point into a plurality of branch lines, in each of the branch lines a variable restrictor, by means of which the mass flow in each of the branch lines can be adjusted, and, belonging to each restrictor, a first pressure measuring device, by means of which the pressure drop of the flowing medium at the respective restrictor is measured.

The invention relates, furthermore, to a method for operating such a pipeline system.

2. Discussion of Background

In power station technology or even other areas of use, there is often the task of supplying a multiplicity of consumers with a mass flow of a compressible or incompressible medium (for example, cooling water, steam, oil or the like). The supply system used for this purpose consists typically of a network of pipelines which is distinguished by branching points (junction points), at which a main line (a main stream of the medium) branches into two or more branch lines, (branch streams) which lead to the individual consumers or groups of consumers. In many instances, it is necessary, in this case, for the mass flow to be controlled in each individual branch line according to the requirements of the consumer or consumers. For this purpose, for example, a control valve may be arranged in the branch line, the lift of said control valve being adjusted in such a way that the desired mass flow flows through the valve.

A simple way of controlling the mass flow of the medium by means of a control valve is to calculate the valve lift which is required in order to produce the predetermined mass flow. The calculation of the valve lift is typically based on the pressure loss (pressure drop) measured at the control valve, on the characteristic of the valve and on the properties of the medium. In the simplest instance, a pipeline system, as represented in FIG. 1, is then obtained (for example, for the fuel supply system of an industrial gas turbine). In the pipeline system 10 of FIG. 1, a main line 11 branches at a branching point 12 into (for example) three branch lines 13,14 and 15. Provided in each of the branch lines 13,14,15 is a valve V1 or V2 or V3, by means of which the mass flow through the respective branch line can be adjusted (controlled). Arranged parallel to the valve V1,V2,V3 in each case is a pressure measuring device PM1 or PM2 or PM3 which measures the pressure drop at the valve.

If the valve lift of the valves V1, . . . ,V3 is designed by h, then h is a function of the valve characteristic $K_V$, namely $$h=h(K_V). \tag{1}$$

For a compressible medium (for example, the fuel gas for the gas turbine), the quantity $K_V$ for sub-critical flow conditions is obtained as $$K_V=\alpha(dm/dt)[T_M/(p_M-\Delta p)]^{1/2}[1/\Delta p]^{1/2}, \tag{2}$$

with the constant α, the mass flow dm/dt, the pressure $P_M$ and the temperature $T_M$ at the branching point 12 and in the main line 11 respectively, and the pressure drop Δp at the valve. For a predetermined mass flow dm/dt, the quantity $K_V$ can be determined on the basis of the measured quantities $T_M$, $p_M$ and Δp according to equation (2). The valve lift can be calculated from this from the predetermined valve characteristic $K_V$(h). A comparable determination can also be carried out for the incompressible media.

The most important quantity for calculating the valve lift is the pressure drop measured at the valves V1, . . . ,V3. If this measurement becomes defective, this leads to an unacceptable failure of the supply system (and, in the case of a gas turbine, to an emergency shutdown) or even (for example, in the case of a cooling water system) to a safety risk. It is therefore desirable, in many instances, to make the measurement of the pressure drop at the valves V, . . . ,V3 redundant, so that a fault in an individual measurement of the pressure drop Δp does not affect or impair the continuous reliable operation of the plant (availability requirement AR).

The purpose of a redundancy concept is twofold: (1) the occurrence of a measuring fault is to be recognized and the faulty measuring device and faulty measuring channel are to be identified. (2) The (non) useable measured values are to be replaced by measured values determined redundantly.

Two fundamental types of fault are to be taken into account here:

Notified Faults (Notified Failure NF):

This type of fault embraces all the faults which are notified to the control system by the transmitter or another I/O device by means of a bad data quality (BDQ) signal. The control system knows from the BDQ signal which Δp signal is faulty. This occurs typically when a measuring line is interrupted or a fault occurs in a component in a measuring chain.

Drift in Measurement:

This type of fault describes the creeping deterioration of the measurement signal, so that the transmitted information is no longer a valid measurement of the pressure drop. It cannot be detected and is therefore also not notified to the control system. Other ways of handling this type of fault must therefore be adopted.

The redundant measurement of the pressure drop may be carried out with double redundancy according to FIG. 2. In the case of double redundancy, in addition to the pressure measuring device PM1, . . . ,PM3 already present a second pressure measuring device PM4, . . . ,PM6 is in each case arranged in parallel for each valve. If one of the two pressure measurements (per valve) is faulty, there can be a changeover to the other pressure measurement. However, this is possible only for notified faults, in which the faulty measurement can be detected by means of the BDQ signal. By contrast, a drift in the measurement cannot be overcome by means of double redundancy, since, with only two independent measurements per valve, it is not possible to decide which of the two measurements is disrupted (or is drifting).

To overcome this problem, the redundant measurement of the pressure drop may be carried out with triple redundancy according to FIG. 3. In the case of triple redundancy, in addition to the pressure measuring device PM1, . . . ,PM3 already present a second pressure measuring device PM4, . . . ,PM6 and a third pressure measuring device PM7, . . . ,PM9 are in each case arranged in parallel for each valve. The 2 of 3 selection principle is employed to determine the faulty measurement in the case of drift. In the 2 of 3 selection principle, it is assumed that, if 2 of 3 measuring channels give the same measured values, these measuring channels are working faultlessly, whilst the third measuring channel is faulty.

Both in the case of double redundancy illustrated in FIG. 2 and, in particular, in the case of triple redundancy illustrated in FIG. 3, there is the disadvantage that a very large number of independent pressure measuring devices PM1, . . . ,PM6 or PM1, . . . ,PM9 must be used, thus involving considerable outlay, particularly in the case of triple redundancy with three pressure measuring devices per branch line.

SUMMARY OF THE INVENTION

The object of the invention is to improve a pipeline system of the initially mentioned type, to the effect that increased fault tolerance at a comparatively low additional outlay is achieved in the recording of measured values.

In a pipeline system of the initially mentioned type, the object is achieved in that, to obtain redundancy in pressure measurement, at least between two of the branch lines a second pressure measuring device for measuring the differential pressure between the respective branch lines is arranged downstream of the restrictors in the direction of flow. By adding the second pressure measuring device in the specified way, double redundancy is obtained for measuring the pressure drop at the restrictors of the two relevant branch lines. The three pressure measuring devices measure the differences between altogether three pressures (the pressure in the main line and the pressures in the two branch lines downstream of the restrictors), each of the three pressures being taken in each case as a reference value by two pressure measuring devices. In the case of faultless measurement, therefore, the three measured values of the three pressure measuring devices are linearly dependent: the sum of the measured values must (if the signs are correctly selected) be equal to zero. Each measured pressure value for a branch line can therefore be determined in two different ways (double redundancy): on the one hand, as a direct measured value of the associated first pressure measuring device and, on the other hand, from the sum of the measured values of the other two pressure measuring devices. Thus, by virtue of the invention, double redundancy can be brought about by means of three pressure measuring devices for two branch lines, whereas, if the arrangement from FIG. 2 were employed, four pressure measuring devices would be necessary.

If double redundancy is to be brought about for all branch lines, according to a first preferred embodiment of the invention, between each branch line and, in each case, another branch line, a second pressure measuring device for measuring the differential pressure between the respective branch lines is arranged. In the case of n branch lines, therefore, n-1 pressure measuring devices are required.

The saving becomes even more marked if triple redundancy is to be attained by means of the principle of the invention. This is achieved, according to a second preferred embodiment of the invention, in that between each branch line and, in each case, two further branch lines a second pressure measuring device for measuring the differential pressure between the respective branch lines is arranged in each case.

The method according to the invention for operating the pipeline system is distinguished in that, for each pair of branch lines, the associated first pressure measuring devices and the second pressure measuring device which is arranged between the pair of branch lines are in each case combined to form a group, the sum of the measured pressure values being equal to zero if the pressure measuring devices for each group of pressure measuring devices functions properly, and in that, if one of the first pressure measuring devices fails within a group, the associated measured pressure value is determined from the measured pressure values of the other two pressure measuring devices of the group.

A preferred embodiment of the method according to the invention is distinguished in that each first pressure measuring device is in each case represented in two groups of pressure measuring devices, and in that the measured pressure values from the first pressure measuring device are treated as faulty if the associated measured pressure values determined from the other two pressure measuring devices of each of the two groups are identical to one another, but not to the measured pressure values emitted by the first pressure measuring device.

Further embodiments emerge from the dependent claims.

BRIEF DESCRIPTION OF THE DRAWINGS

A more complete appreciation of the invention and many of the attendant advantages thereof will be readily obtained as the same becomes better understood by reference to the following detailed description, when considered in connection with the accompanying drawings, wherein.

DESCRIPTION OF THE PREFERRED EMBODIMENT

Figure 4:
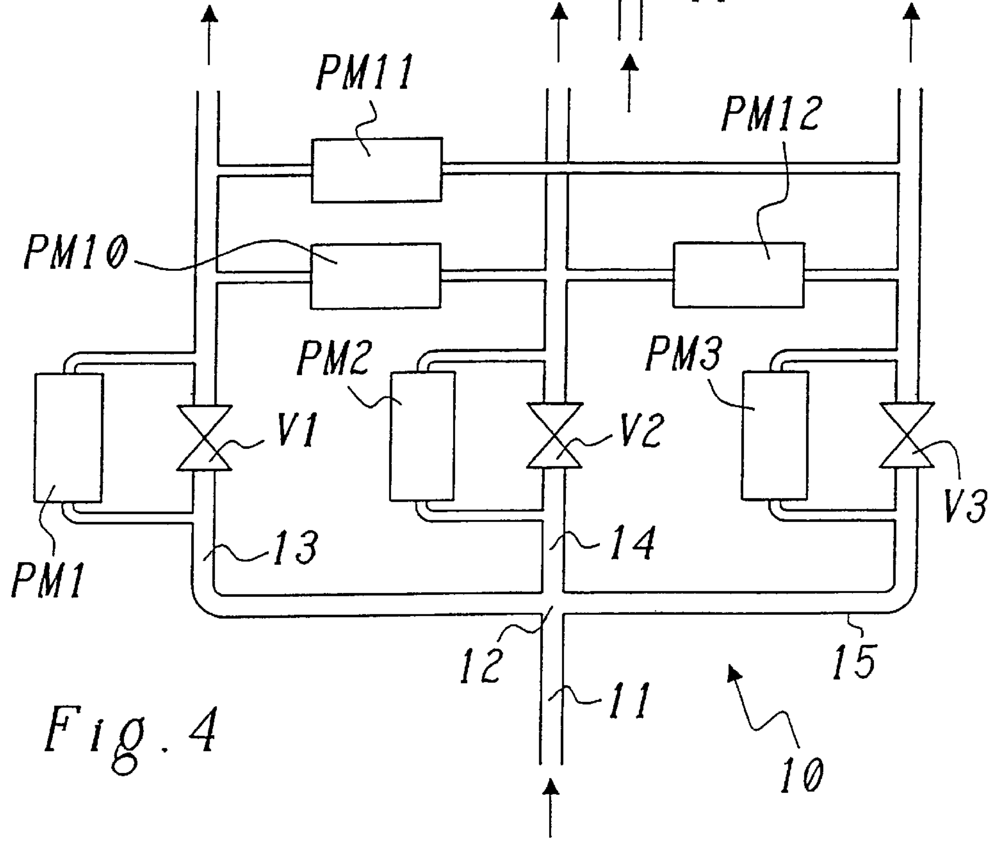
FIG. 4 shows a preferred exemplary embodiment of the invention which is based on a pipeline system according to FIG. 1 and which, in contrast to FIG. 3, obtains triple redundancy by means of (few) additional pressure measuring devices between the branch lines.

Referring now to the drawings, wherein like reference numerals designate identical corresponding parts throughout the several views, in FIG. 4 a preferred exemplary embodiment of the pipeline system according to the invention is represented, which, in the case of a main line and three branch lines, allows triple redundancy by means of only three additional pressure measuring devices. The pipeline system 10 comprises a main line 11 which branches at a branching point 12 into the three branch lines 13,14,15. A valve V1,V2 and V3 is installed as a controllable restrictor in each of the branch lines. The pressure drop (pressure loss) at the valves V1,V2,V3 is first measured directly by a first pressure measuring device PM1 or PM2 or PM3 arranged parallel to the valve. For this purpose, as shown in the Figures, pipelines may be led on both sides of the valve from the branch line to the pressure measuring devices. However, it is also just as conceivable to arrange pressure sensors directly on the branch lines upstream and downstream of the valve and lead signal lines from the pressure sensors to the actual pressure measuring device. The system from FIG. 4 is thus far directly comparable to the system from FIG. 1.

Figure 1:
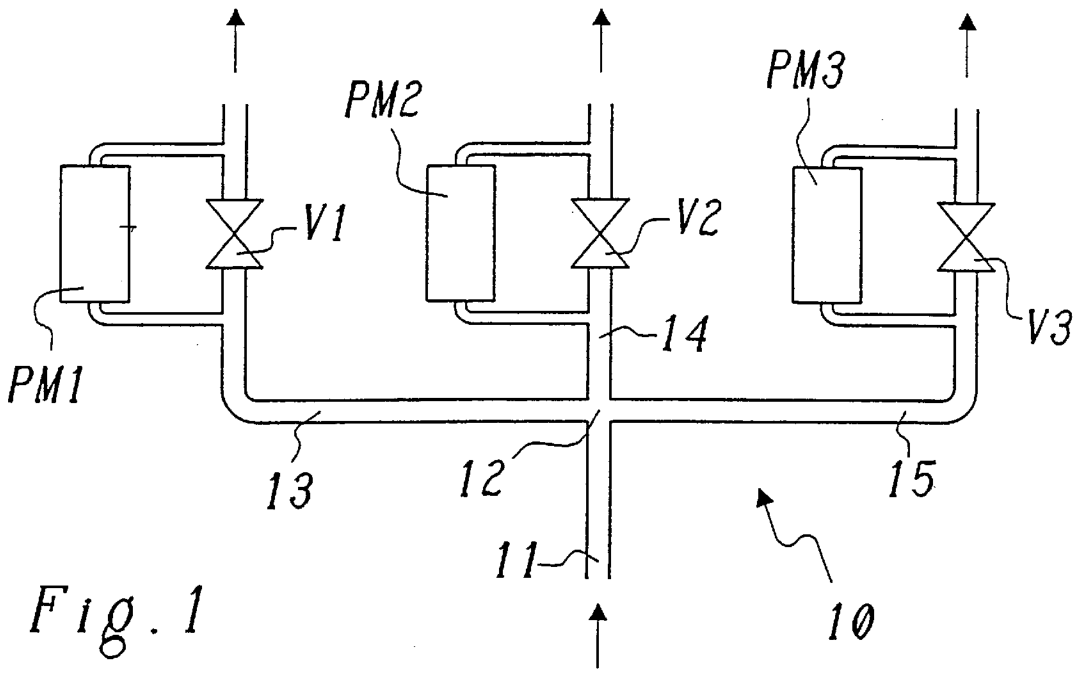
FIG. 1 shows a pipeline system with three branch lines according to the prior art, with one pressure measuring device per restrictor (valve)
Figure 2:
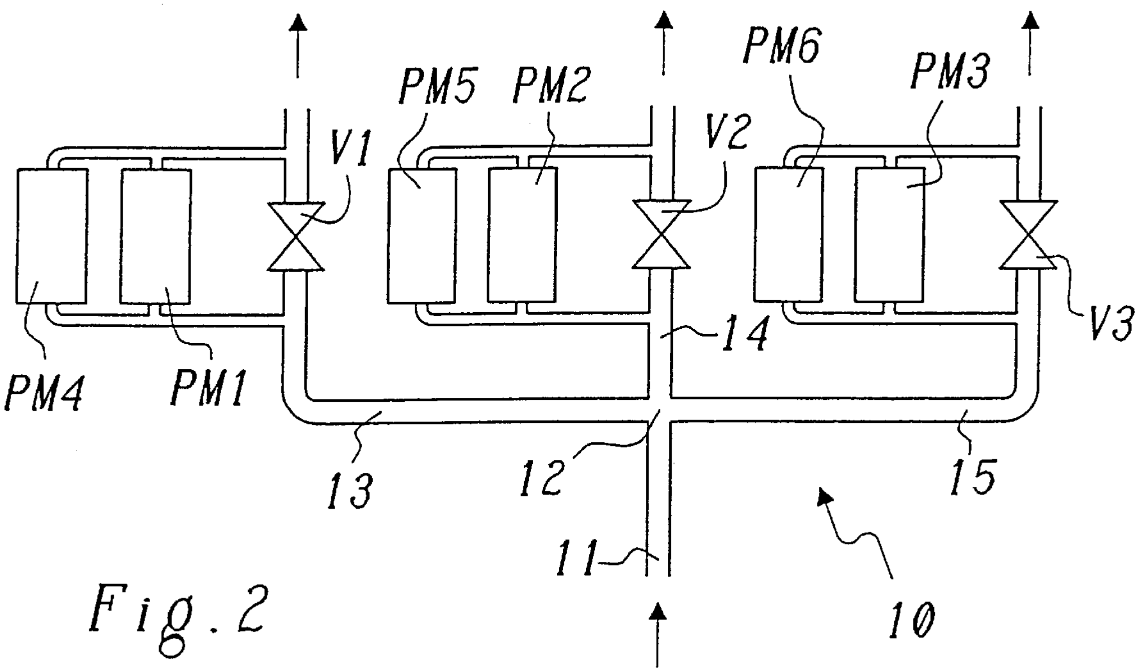
FIG. 2 shows the system from FIG. 1 with two pressure measuring devices per restrictor (valve) in order to obtain double redundancy.

In contrast to FIG. 1 (and also FIG. 3), in the example in FIG. 4 there are three second pressure measuring devices PM10,PM11 and PM12 which are in each case arranged downstream of the valves V1, V2 and V3 between the branch lines and which measure the pressure difference between two of the branch lines 13,14 and 15 in each case.

The pressure measuring devices PM1,PM2 and PM3 therefore measure the pressure drop Δp1, Δp2 and Δp3 at the valves V1,V2 and V3. The pressure measuring devices PM10,PM11 and PM12 measure the differential pressures Δp10,Δp11 and Δp12 between the pairs of branch lines 13/14,13/15 and 14/15. Since the pressure upstream of the valves V1,V2 and V3 must be the same in all the branch lines, the differential pressures are not linearly independent, but must satisfy the following equations (according to the first and second law of Kirchhoff in electric networks):

$$c1 = \Delta p1 + \Delta p10 - \Delta p2 = 0 \quad (3)$$

$$c2 = \Delta p2 + \Delta p12 - \Delta p3 = 0 \quad (4)$$

$$c3 = \Delta p3 - \Delta p11 - \Delta p1 = 0 \quad (5)$$

$$c4 = \Delta p11 - \Delta p10 - \Delta p12 = 0 \quad (6)$$

These equations define conditions (constraints c1to c4), from which the redundant pressure information can be derived. Thus, for example, the pressure difference (pressure drop) Δp1 at the valve V1 in the branch line 13 can be determined in three different ways independently of one another, namely (i) directly by means of the pressure measuring device PM1, (ii) indirectly by means of the pressure measuring devices PM2 and PM10 with the aid of equation (3), and (iii) indirectly by means of the pressure measuring devices PM3 and PM11 with the aid of equation (5). The same applies correspondingly to the pressure drops at the other valves V2 and V3.

As long as the pressure measuring devices and the associated channels are working properly, equations (3) to (6) and the conditions linked to them are satisfied, that is to say c1=c2=c3=c4=0. As soon as a pressure measurement is faulty, one or more of the constraints c1 to c4≠0 and the conditions linked to them are violated. If, for example, the pressure measurement at Δp1 is faulty, then c1≠0 and c3 ≠0. The following systematic logic table may be compiled for the various cases in which a faulty pressure measurement leads to the violation of specific conditions:

TABLE

| Condition | Δp1 | Δp2 | Δp3 | Δp10 | Δp11 | Δp12 |
|---|---|---|---|---|---|---|
| c1 = Δp1 + Δp10 − Δp2 = 0 | 1 | 1 | 0 | 1 | 0 | 0 |
| c1 = Δp2 + Δp12 − Δp3 = 0 | 0 | 1 | 1 | 0 | 0 | 1 |
| c3 = Δp3 − Δp11 − Δp1 = 0 | 1 | 0 | 1 | 0 | 1 | 0 |
| c4 = Δp11 − Δp10 − Δp12 = 0 | 0 | 0 | 0 | 1 | 1 | 1 |

Each of the conditions ci, i=1, . . . ,4 defines a row of a matrix and each pressure measurement Δpj, j=1, . . . ,3,10, . . . ,12 defines a column of the matrix. For a faulty pressure measurement Δpj, the violation of the condition ci is indicated by a matrix element "1" in the j'th column and the i'th row. Nonviolated conditions are indicated correspondingly by a matrix element "0". If, as in the abovementioned example, the measurement of Δp1 is faulty, according to the table the conditions c1 and c3 are violated (matrix elements are "1"). Conditions c2 and c4 are not affected by this fault (matrix elements are "0").

The indicated table makes it possible, conversely, to infer the faulty pressure measurement from the violated conditions. The faulty measurement may then be derived from the other pressure measurements by solving the relevant equations.

Example:

It becomes clear from the measurements that conditions c2 and c3 are not satisfied (c2≠0; c3≠0). It may be derived from the above table that the pressure measurement of Δp3 is faulty (matrix value "1" in the column belonging to Δp3) . The missing measured value for Δp3 may, then, be derived from the measurements of Δp2 and Δp12 via equation (4) or from the measurements of Δp1 and Δp11 via equation (5).

The procedure explained may be adopted when only one of the pressure measurements is faulty. This is in contrast to the situation where a plurality of (two or more) pressure measurements are faulty simultaneously. Assignment, as compiled above in the form of the table, is then no longer unequivocal. Although it is possible to establish (on the basis of a violation of conditions c1 to c4) that faulty pressure measurements are present, it is nevertheless impossible to determine unequivocally which of the pressure measurements are faulty.

Example:

When the conditions c1,c2 and c3 are violated (c1≠0; c2≠0; c3≠0) , the measurements of Δp1 and Δp2 or the measurements of Δp2 and Δp3 or the measurements of Δp1 and Δp3 or the measurements of Δp1,Δp2 and Δp3 may be faulty. If only two measurements are faulty and, for example, the measurements for Δp1 and Δp3 can be identified as faulty by means of a corresponding BDQ signal, then Δp1 may be calculated from Δp10 and Δp2 by solving equation (3) or Δp3 may be calculated from Δp2 and Δp12 by solving equation (4).

If three measurements are faulty simultaneously, the faulty measurements at the valves V1,V2 and V3 can be restored only when at least one of the measurements Δp1, Δp2 and Δp3 is faultless.

Example:

If the pressure measurements of Δp1,Δp2 and Δp10 are faulty, then Δp1 may be calculated from Δp3 and Δp11, using equation (5), and Δp2 may be calculated from Δp3 and Δp12, using equation (4).

Only if Δp1,Δp2 and Δp3 are faulty simultaneously is it impossible to calculate these values from the other measured values, because, in this case, the system of equations (3) to (6) is singular. This corresponds to the (physical) circumstance that the differential pressures between the branch lines 13,14,15 do not, each on their own, contain any information on the pressure drops at the valves V1,V2 and V3.

Altogether, system according to FIG. 4 allows the following corrections to be made:

(a) the detection and identification of the faulty pressure measurement and the derivation of the correct measured value when an individual pressure measurement becomes faulty as a result of drift; and (b) the detection of the faulty pressure measurements and the derivation of the correct measured values after identification of the faulty measurements, for example by means of a BDQ signal, when any two measurements are faulty simultaneously; and (c) the detection of the faulty pressure measurements and the derivation of the correct measured values after identification of the faulty measurements, for example by means of a BDQ signal, when any three measurements are faulty simultaneously; this excludes the special case where all three pressure measurements at the valves are faulty simultaneously.

Figure 3:
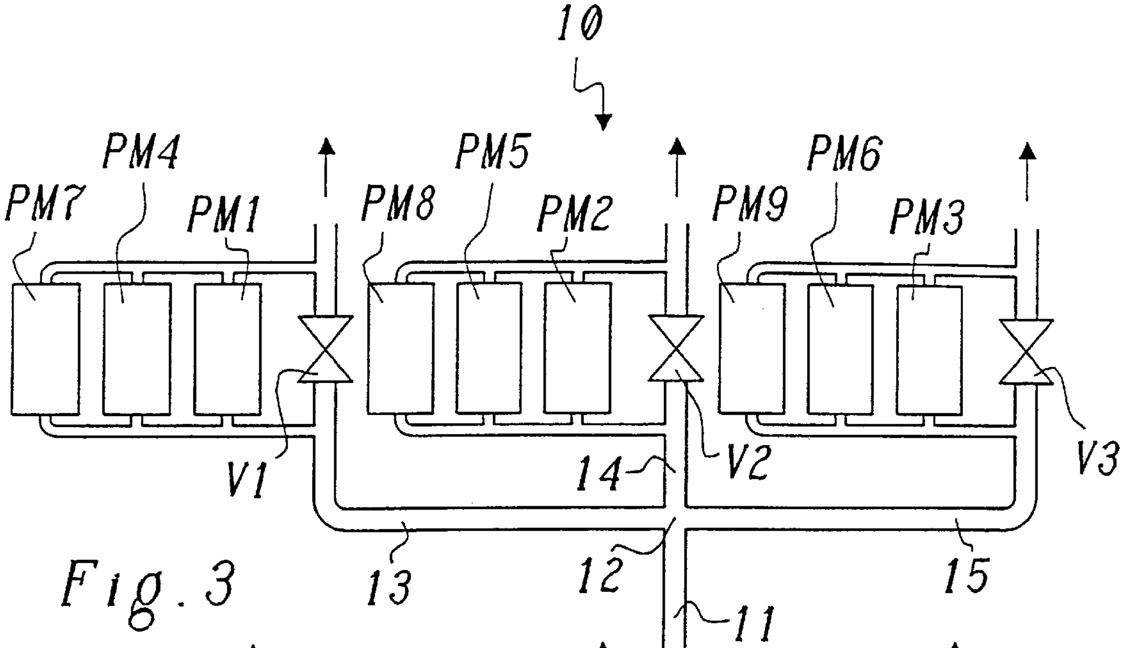
FIG. 3 shows the system from FIG. 1 with three pressure measuring devices per restrictor (valve) in order to obtain triple redundancy.

In the example of the three branch lines which was discussed above, three additional pressure measuring devices PM10,PM11 and PM12 are sufficient for obtaining essentially the same redundancy as in a system according to FIG. 3. If further branch lines are added, it is necessary, for each additional branch line, to have two additional pressure measuring devices which are arranged between the additional branch line and any two other branch lines. In this case, as compared with the arrangement from FIG. 3, the maximum saving in terms of pressure measuring devices is obtained in the case of three branch lines.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A pipeline system (10) for the controlled distribution of a flowing medium, comprising a main line (11) which branches at a branching point (12) into a plurality of branch lines (13,14,15), in each of the branch lines a variable restrictor (V1,V2,V3), by means of which the mass flow in each of the branch lines (13,14,15) can be adjusted, and, belonging to each restrictor (V1,V2,V3), a first pressure measuring device (PM1,PM2,PM3), by means of which the pressure drop of the flowing medium at the respective restrictor (V1,V2,V3) is measured, wherein, in order to obtain redundancy in the pressure measurement, at least between two of the branch lines (13,14 or 13,15 or 14,15) a second pressure measuring device (PM10 or PM11 or PM12) for measuring the differential pressure between the respective branch lines (13,14 or 13,15 or 14,15) is arranged downstream of the restrictors (V1,V2 or V1,V3 or V2,V3) in the direction of flow.

2. The pipeline system as claimed in claim 1, wherein between each branch line (13,14,15) and, in each case, another branch line (14 or 13 or 14) a second pressure measuring device (PM10 or PM12) for measuring the differential pressure between the respective branch lines (13,14 or 14,13 or 15,14) is arranged.

3. The pipeline system as claimed in claim 1, wherein between each branch line (13,14,15) and, in each case, two further branch lines (14,15 or 13,15 or 13,14) a second pressure measuring device (PM10,PM11 or PM10,PM12 or PM11,PM12) for measuring the differential pressure between the respective branch lines (13,14,15) is arranged in each case.

4. The pipeline system as claimed in claim 1, wherein the restrictors are designed as valves (V1,V2,V3).

5. The pipeline system as claimed in claim 1, wherein three branch lines (13,14,15) are used.

6. A method for operating a pipeline system as claimed in claim 1, wherein, for each pair of branch lines (13,14 or 14,15 or 13,15), the associated first pressure measuring devices (PM1,PM2 or PM2,PM3 or PM1,PM3) and the second pressure measuring device (PM10 or PM12 or PM11) which is arranged between the pair of branch lines are in each case combined to form a group, the sum of the measured pressure values being equal to zero for each group of pressure measuring devices when the pressure measuring devices are functioning properly, and wherein, when one of the first pressure measuring devices (PM1 or PM2,PM2 or PM3, PM1 or PM3) fails within a group, the associated measured pressure value is determined from the measured pressure values of the other two pressure measuring devices of the group.

7. The method as claimed in claim 5, wherein each first pressure measuring device (PM1,PM2,PM3) is represented in each case in two groups of pressure measuring devices, and wherein the measured pressure values from the first pressure measuring device are treated as faulty when the associated measured pressure values determined from the other two pressure measuring devices of each of the two groups are identical to one another, but not to the measured pressure values emitted by the first pressure measuring device.

* * * * *